United States Patent [19]

Methvin et al.

[11] Patent Number: 4,896,133
[45] Date of Patent: Jan. 23, 1990

[54] PARALLEL STRING PROCESSOR AND METHOD FOR A MINICOMPUTER

[75] Inventors: David H. Methvin, Boulder, Colo.; Angus McLagan, Newport Beach, Calif.; Gei-Jon Pao, Garden Grove, Calif.; Chong S. Un, Anaheim, Calif.

[73] Assignee: Davin Computer Corporation, Irvine, Calif.

[21] Appl. No.: 262,225

[22] Filed: Oct. 21, 1988

Related U.S. Application Data

[63] Continuation of Ser. No. 88,421, Aug. 20, 1987, abandoned, Continuation-in-part of Ser. No. 12,834, Feb. 10, 1987, abandoned.

[51] Int. Cl.[4] ........................... G05B 1/00; G06F 7/02
[52] U.S. Cl. .............................. 340/146.2; 364/715.11
[58] Field of Search .................................. 340/146.2; 364/715.09–715.11

[56] References Cited

U.S. PATENT DOCUMENTS

| | | | |
|---|---|---|---|
| 3,690,703 | 9/1971 | Peacock | 340/146.2 |
| 4,032,885 | 6/1977 | Roth | 340/146.2 |
| 4,053,871 | 10/1977 | Vidalin et al. | 340/146.2 |
| 4,097,844 | 6/1978 | Moyer | 340/146.2 |
| 4,101,903 | 7/1978 | Slay | 340/146.2 |
| 4,119,946 | 10/1978 | Taylor | 340/146.2 |
| 4,334,248 | 6/1982 | Wong | 364/748 |
| 4,383,304 | 5/1983 | Hirashima | 364/715 |
| 4,443,860 | 4/1984 | Vidalin | 340/146.2 |
| 4,467,444 | 8/1984 | Harmon, Jr. | 364/736 |
| 4,524,345 | 6/1985 | Sybel et al. | 340/146.2 |
| 4,550,436 | 10/1985 | Freeman et al. | 340/146.2 |
| 4,560,974 | 12/1985 | Coleman et al. | 340/146.2 |
| 4,631,696 | 12/1986 | Sakamoto | 364/748 |
| 4,639,886 | 1/1987 | Hashimoto et al. | 364/736 |

OTHER PUBLICATIONS

Gersbach, "Algebraic/Logical Shift Matrix", IBM Technical Disclosure Bulletin, vol. 23, #1, pp. 120–122, Jun. 1980.

Primary Examiner—David L. Clark
Assistant Examiner—Dale M. Shaw
Attorney, Agent, or Firm—Knobbe, Martens, Olson, & Bear

[57] ABSTRACT

A processor is disclosed for use in a computer system for comparing a number of bytes simultaneously in order to locate a control character in a string of data. The processor includes a register for holding the data bytes, a register for storing the control characters, a comparison circuit for simultaneously comparing the bytes of the first register with the bytes of the second register, and a circuit for generating indicator bits when a match has been found between the two registers. Microcode instructions cause the system to branch to a predetermined memory location when the control character has been located and to branch to a second predetermined memory location when no control character is found in the data string.

In another aspect, a parallel string processor for a minicomputer for searching portions of text or binary bit strings for the presence of desired words or bit strings. The processor includes a first register in which a keyword string is stored and a pair of interconnected shift registers in which the string to be searched for the presence of the keyword is stored. An arithmetic logic unit compares the contents of the first register with one of the shift registers to determine whether the keyword is present in the portion of the string being searched. After each such comparison, the contents of the interconnected shift registers are shifted with respect to the keyword stored in the first register. When the processor is searching for the presence of a keyword having a predetermined number of bytes, the contents of the shift registers are shifted one bytes at a time, and when the processor is searching for the presence of a keyword having a predetermined number of bits, the contents of the shift registers are shifted one bit at a time.

23 Claims, 7 Drawing Sheets

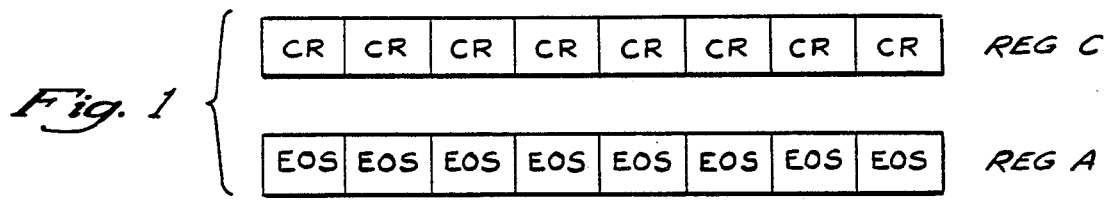

Fig. 1

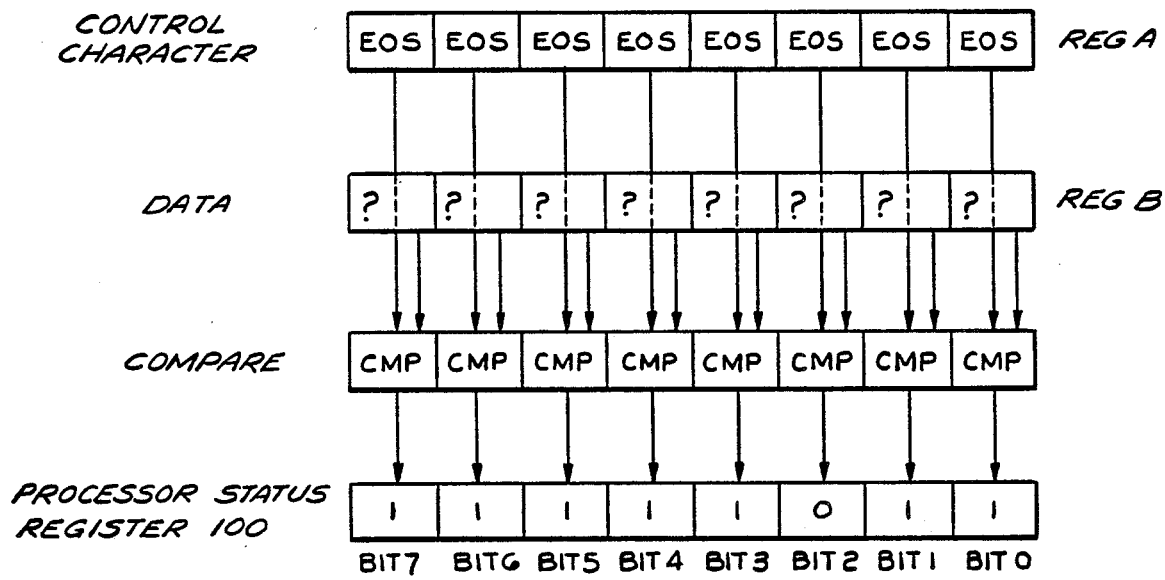

Fig. 2

```
80  LD    RA   CHAR1  {*LOAD REGISTER A WITH FIRST CHARACTER*}

82  LD    RB   DATA1  {*LOAD REGISTER B WITH INPUT STRING DATA*}

84  EXNOR RB   RA     {*COMPARE INPUT STRING TO FIRST CHARACTER*}

86  BAH        400    {*BRANCH IF ANY BYTES ARE EQUAL TO FIRST
                       CHARACTER*}

88  LD    RA   CHAR2  {*LOAD REGISTER A WITH SECOND CHARACTER*}

90  EXNOR RB   RC     {*COMPARE INPUT STRING TO SECOND CHARACTER*}

92  BAH        400    {*BRANCH IF ANY BYTES ARE EQUAL TO SECOND
                       CHARACTER*}

94  ST    RB   BUF1   {*STORE INPUT STRING IN BUFFER*}

96  JMP        80     {*LOOP TO GET NEXT INPUT STRING AND
                       COMPARE*}
```

Fig. 4

PARALLEL STRING PROCESSOR AND METHOD FOR A MINICOMPUTER

This application is a continuation of application Ser. No. 088,421, filed 8/20/87, now abandoned, which is a continuation-in-part of Ser. No. 012,834, filed 2/10/87 now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to computer systems for processing strings of data, and also to a parallel string processor for a minicomputer and a method of searching strings of bits and bytes for the presence of a desired keyword.

Prior art computers and microprocessors process data strings one byte at a time. One of the most frequently occurring processing tasks is to attempt to locate one or more control characters in a data string. Prior art systems compare the data one byte at a time to the control or reference characters which are loaded into a CPU (central processing unit) register. After a byte is compared, the data string is rotated one byte so that the next byte in the data string is compared, continuing until all bytes are compared.

The foregoing is a time-consuming procedure and utilizes a substantial amount of computer time as numerous repetitions of the comparison process are required to check each byte sequentially in order to determine whether it contains the reference character. For example, there may be only one "carriage return" (CR) character found per 80-character line, but all 80 characters must be compared one at a time. If a data string has 512 bytes, and each byte is separately compared to the control character, the comparison must be executed 512 times. Thus, a need exists for reducing the amount of time required to compare strings of data and find control characters embedded in the strings.

Eight bytes of data are simultaneously compared. Thus, the number of comparisons necessary is reduced by a factor of 8 relative to a single byte comparison, resulting in a substantial reduction of processing time. Since the comparison procedure is commonly executed numerous times in any given program, a significant saving in processing time may be achieved by this simultaneous comparison of a number of bytes.

In other computer applications it is desirable to have the capability to search long strings of bytes for the presence of a selected pattern of bytes. One such application that is relatively well known is used in the word processing context. This application allows one to search a portion of text for a particular word or phrase. For example, one may want to find each occurrence of the word "country" within a particular document so that the word "county" can be substituted therefor. Alternatively, one may want to find each occurrence of "couty" so that it can be replaced with the proper spelling "country." These are known as search and replace operations. Search and replace operations are also used in connection with automatic spelling check programs that are offered by many commercially available word processing programs.

In word processing programs and other programs in which words and letters are used, each letter of the alphabet as well as each symbol such as an asterisk or hyphen is represented as a unique string of eight 1 or 0 logic bits, also known as a byte. In order to determine whether two byte strings represent the same word, the corresponding bits in each byte are compared to determine whether they are the same. If all of the bits in the two byte strings are identical, the two byte strings represent the same word.

A portion of text can be thought of and is represented as a long, continuous string of bytes, one byte for each letter appearing in the portion of text. To determine whether a particular word, or "keyword," appears in a portion of text, current string processors typically, starting at the beginning of the byte string that represents the portion of text, or the "character string," compare the first byte of the keyword with the first byte of the character string. If these two byte match (the first letter of the keyword matches the first letter in the portion of text), then the processor compares the second byte in the keyword to the second byte in the character string. If these two bytes match, then the processor compares the next pair of bytes in the two strings, and so on. If all of the respective bytes in the two strings match, the processor has found an occurrence of the keyword in the portion of text.

However, the keyword does not usually appear as the first word in the portion of text being searched. Consequently, one of the bytes of the keyword will not match one of the bytes in the character string (the keyword is not the first word in the portion of text). In this case, the character string is shifted one byte relative to the keyword so that the first byte of the keyword is compared to the second byte of the character string. If these two bytes match, then the second byte of the keyword is compared to the third byte of the character string, and so on. If one of the pairs of bytes do not match, then the character string is again shifted one byte relative to the keyword so that the first byte of the keyword is now compared to the third byte of the character string. This general process repeats, usually until all occurrences of the keyword in the portion of text have been found.

As an example, let the keyword be the word "the" and the character string be "that time is the essence." Initially, as described above and set forth below, the byte representing the "t" in "the" will be compared to the byte representing the "t" in "that":

---
| | |
|---|---|
| Data String: | that time is the essence |
| Keyword: | the |
---

This comparison will yield a match, and so the byte representing the "h" in "the" will be compared with the byte representing the "h" in "that." These bytes will also match, and so the byte representing the "e" in "the" will be compared to the byte representing the "a" in "that." These bytes will not match, and so the character string will be shifted one byte with respect to the keyword so that the first byte of "the" will be compared with the second byte in the character string. The relative position of the keyword and the character string are set forth below, and the "3" above the letter "t" in the word "that" is the number of comparisons that were required to determine whether or not there was a match.

| Comparisons: | 3 |
|---|---|
| Data String: | that time is the essence |
| Keyword: | the |

Only one comparison will be needed at this point to determine that the keyword is not present at this portion of the character string, and the character string will be shifted again:

| Comparisons: | 31 |
|---|---|
| Data String: | that time is the essence |
| Keyword: | the |

This process will continue to repeat until the match is found, at which point the character string will have been shifted to the position set forth below:

| Comparisons: | 31121211111114 |
|---|---|
| Data String: | that time is the essence |
| Keyword: | the |

Note that this particular example required 21 comparisons to find the keyword "the" in the character string "that time is the essence." In particular, four comparisons were required even where the keyword matched the same word in the character string (the blank space required one comparison).

In other computer applications it is desirable to test bit patterns for the presence of a particular bit string. Examples of such applications are encryption and decryption algorithms used to scramble and unscramble binary information to protect it from unauthorized reception. Such algorithms are often used in the intelligence field to protect highly classified information from being intercepted and used by foreign countries having adverse interests. These algorithms are also used by corporations to safeguard their valuable commercial information and trade secretes.

In general, these encryption and decryption algorithms may perform similar search and replace operations as described above in connection with word processing programs. In addition, it would be desirable to be able to perform operations on strings of binary information that are not an integral number of bytes long, for example, a string of five bits. Processors such as those described above in connection with word processing programs do not even have this capability since they shift strings of eight bits, or one byte, at a time. Even if such processors had the capability to shift strings of data one bit at a time, their use as described above on strings of bits would be even slower due to the large number of comparisons that would be necessary. As an example, assume that the bit string "11001110011011" is to be searched for the presence of the keyword "1101." Initially, as described above, the first bit of the keyword would be compared to the first bit in the bit string as set forth below:

| Bit String: | 11001110011011 |
|---|---|
| Keyword: | 1101 |

The processor would need to make four comparisons before it could determine that the four bits in the keyword do not match the first four bits in the bit string. Again, as described above, the processor would then shift the bit string relative to the keyword string as set forth below and compare the respective bits again:

| Comparisons: | 4 |
|---|---|
| Bit String: | 11001110011011 |
| Keyword: | 1101 |

Again, the "4" above the first "1" in the bit string means that four comparisons were required in order to determine that the keyword did not match. After the keyword was shifted as shown above, two comparisons would be required to test the next portion of the bit string. As shown below, 22 comparisons would be needed to find the portion of the bit string that matched the keyword.

| Comparisons: | 4211242114 |
|---|---|
| Bit String: | 11001110011011 |
| Key Word: | 1101 |

A greater number of comparisons are required overall in bit searching than are required in byte or character searching since it is more likely that a pair of bits each having one of two possible values will match than a pair of letters each having one of 26 possible values. Thus, a processor performing operations on bit strings in this manner would have an unduly large amount of computing overhead.

SUMMARY OF THE INVENTION

The present invention comprises a portion of a computer system for comparing a number of bytes simultaneously. The parallel processor of the present invention includes a first register for receiving bytes of data, a second register for storing a number of copies of a byte representing a selectable control or reference character and a comparison circuit for simultaneously comparing the data in the two registers to determine whether any of the bytes in the first register are equal to the bytes representing the control character in the second register, and generating control bits which are in a first state if the corresponding byte in the first register is equal to the control character in the second register, and in a second state when the corresponding byte in the first register is not equal to the control character in said second register.

The parallel byte processor has the ability to branch to a predetermined memory location if any of the byte pairs being simultaneously compared are equal. If any byte of data in the first register is equal to the bytes comprising the control characters in the second register, the microcode instruction branches or proceeds to a predetermined memory location.

If no control character is located in the data in the first register, the instruction branches or proceeds to a second predetermined memory location. Thus, a number of bytes may be moved and checked for control characters with a single instruction, thereby substantially reducing the processing time. In an exemplary embodiment of the present invention, eight bytes of data are simultaneously compared.

Another aspect of the invention is directed towards a novel parallel bit and byte string processor for a minicomputer. In its byte mode, the processor stores a portion of a string of bytes that is to be tested for the presence of a desired keyword in a first register location and stores the keyword in a second register location. Instead of testing the portion of the byte string one byte at a time, the processor simultaneously tests each byte in the keyword with a respective byte in the byte string. Thus, only a string comparison is required to determine whether the keyword is present in any portion of the byte string. If the keyword is not present in the portion of the byte string tested, then the processor shifts the byte string with respect to the keyword and then makes a single comparison of the keyword with the new portion of the byte string. This single-compare-and-test process continues until either the keyword is found or the end of the byte string is reached. As a result of simultaneously testing each byte in the keyword with a respective byte in the byte string, the processing time is kept to an absolute minimum.

In its bit mode of operation, the processor stores a portion of a bit string that is to be tested for the presence of a desired string of bytes in a first register location and the desired keyword in a second register location. The processor simultaneously tests each bit in the keyword with a respective bit in the bit string. As a result of this simultaneous testing, only one comparison is needed to determine whether the keyword is present in the portion of the bit string being tested. If the keyword is not present, the bit string is shifted one bit relative to the keyword and a single comparison of the keyword with the new portion of the bit string is made. This process continues until the keyword is found or until the end of the bit string is reached. Because each bit in the keyword is simultaneously tested with a respective bit in the bit string, only a single comparison is required to determine whether the keyword matches a portion of the bit string, and as a result, processing time is minimized.

Another feature of the invention is the capability of the processor to automatically function either as a parallel bit processor or as a parallel byte processor. When the processor is given a first control signal, the processor functions as a parallel byte processor, and when the processor is given a second control signal, the processor functions as a parallel bit processor. As a result, two separate processors are not required, thus resulting in cost saving that a separate processor would otherwise entail.

These and other objects, features, and advantages of this invention will be apparent in view of the following detailed description of several preferred embodiments, which are explained with reference to the figures, a brief description of which is provided below.

BRIEF DESCRIPTION OF THE DRAWINGS

FIGS. 1 and 2 are block diagrams of two registers of the parallel byte comparison processor;

FIG. 4 is a representative instruction sequence of the parallel byte comparison processor;

DETAILED DESCRIPTION OF SEVERAL PREFERRED EMBODIMENTS

Figure 3:
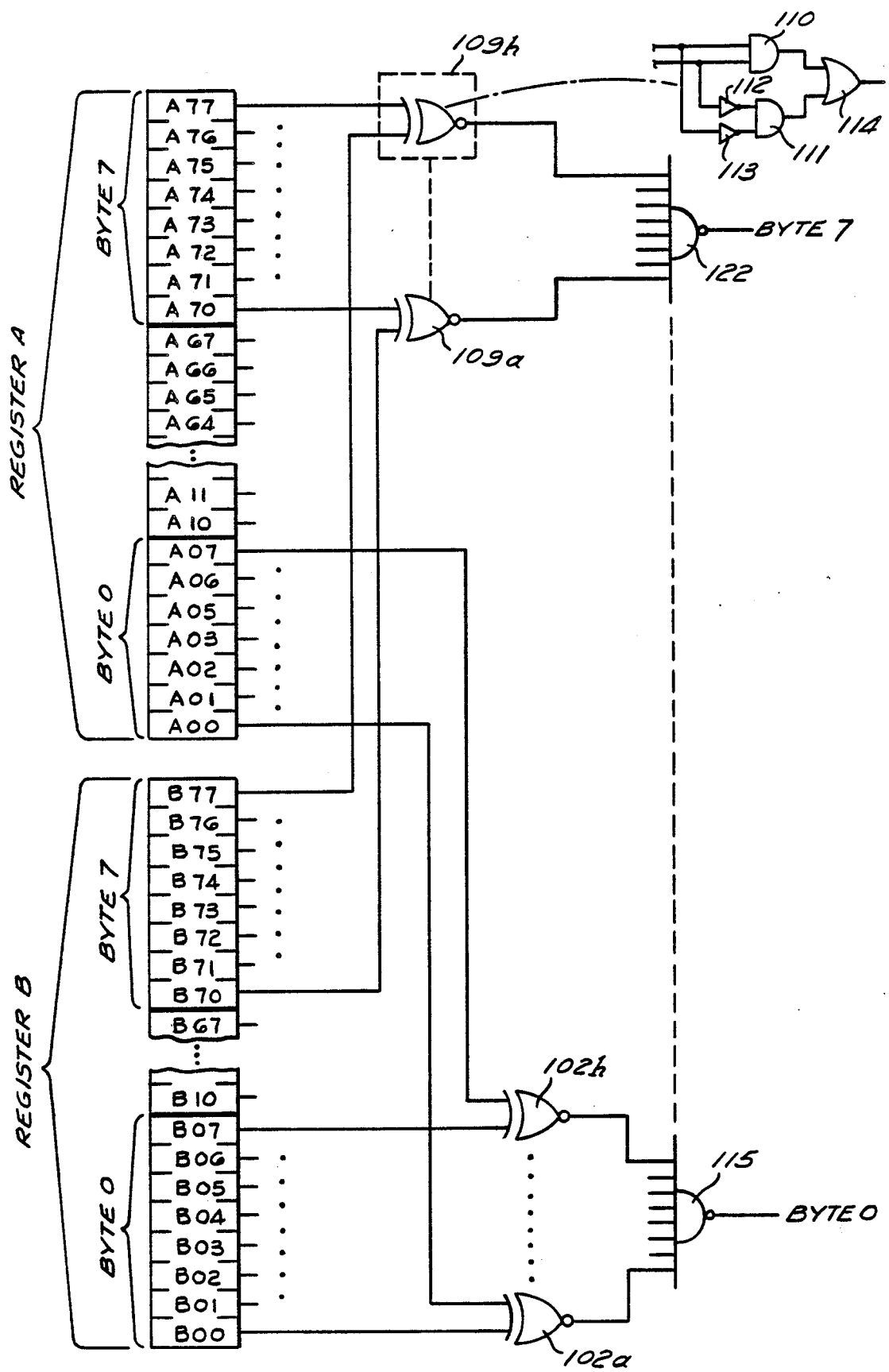
FIG. 3 is a circuit diagram of the comparison circuit of the parallel byte comparison processor.

Referring to FIG. 1, a selected control character, such as "EOS" (end of sector), is loaded into a Register A. Referring to FIG. 2, an 8-byte (64 bit) data string is loaded into a Register B and compared to the "EOS" reference characters in Register A in order to determine whether there are any "EOS" characters in any byte of the data string in the Register A. The results of the comparison, whether any particular byte of Register A matches the corresponding byte in Register B, is stored in a Processor Status Register 100 (also referred to as the "bit register").

It will be appreciated that with the present invention, any number of bytes may be simultaneously compared, the number depending on the particular computer system utilized. In the preferred embodiment discussed herein, the computer is a 64-bit machine; therefore, 8 bytes are simultaneously compared to determine whether they contain a control character.

Figure 5:
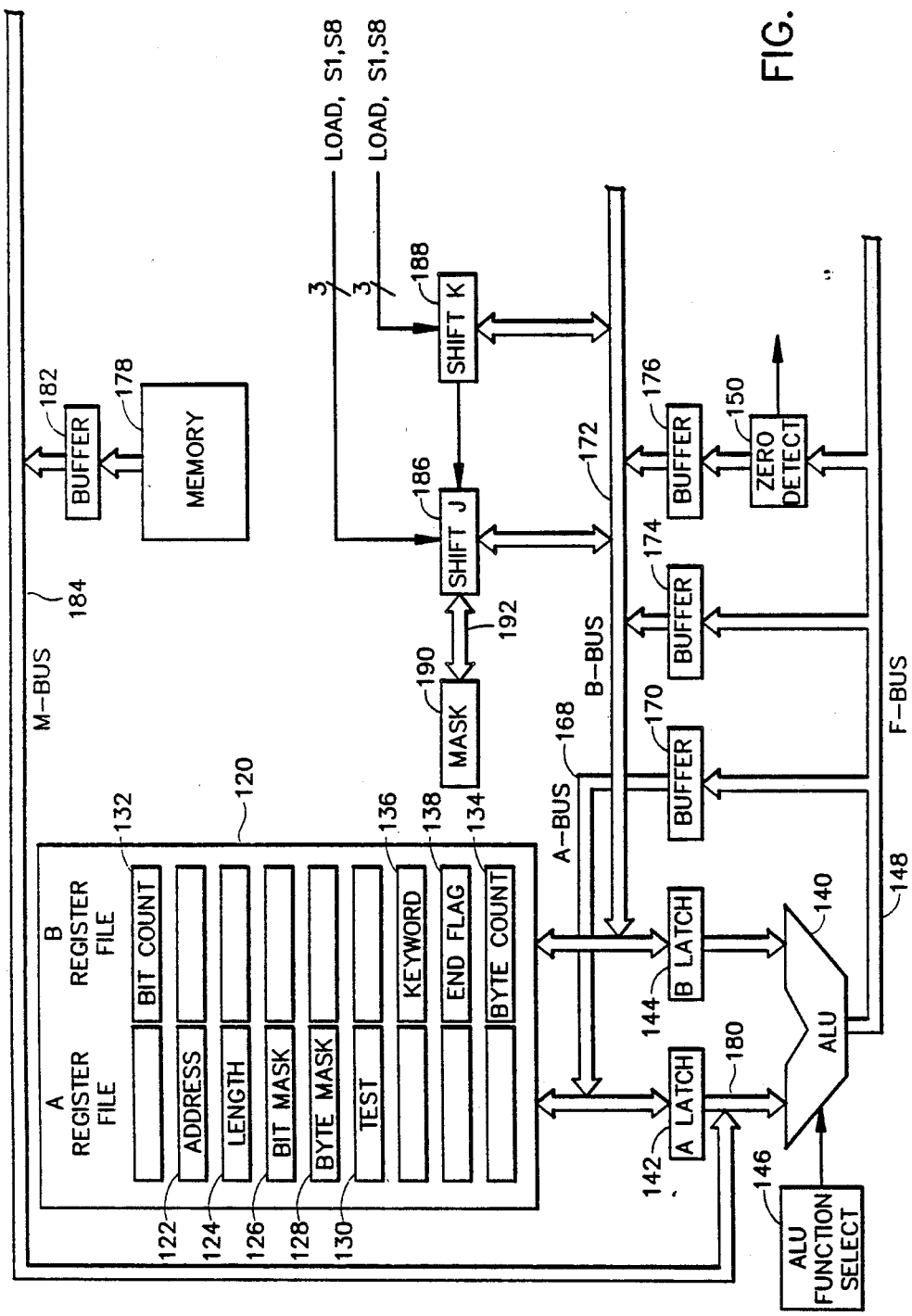
FIG. 5 is a schematic circuit diagram of a parallel string processor in accordance with the invention.

Each bit in the data string in the Register B is compared to the bits comprising the control characters in Register A. This is shown in more detail in FIG. 3, wherein each bit of each byte 0–7 in the Register B is compared with the corresponding bit of each corresponding control character byte 0–7 in the Register A, utilizing "exclusive-NOR" circuits 102–109, one "exclusive-NOR" circuit associated with each bit pair. It should be understood, however, that FIG. 3 is a functional diagram to illustrate the invention. In the actual embodiment, an arithmetic logic unit (ALU) is utilized to perform the exclusive-OR function as shown in FIG. 5 and discussed in further detail hereinafter. In FIG. 3, only the exclusive-NOR circuits 102a and 102h corresponding to byte 0, bit 0 (the least significant bit) and byte 0, bit 7 respectively, and 109a and 109h corresponding to byte 7, bits 0 and 7, respectively are shown. It should be understood, however, that there are 64 such exclusive-NOR circuits. In addition, only the portions of Registers A and B containing bytes 0 and 7, corresponding to the least significant bytes and most significant bytes, respectively, are shown in FIG. 3. The designations within Registers A and B denote the register, the byte number and the bit within the bytes. For example, "A67" refers to bit 7 of byte 6 of the Register A.

The components of the exclusive-NOR circuit 109 are also shown in FIG. 3 as comprising first and second AND gates 110 and 111, first and second inverters 112 and 113, and OR gate 114. The bit pairs, for example, A77 and B77, are input to the AND gate 110. The bits A77 and B77 are also inverted by inverters 112 and 113, respectively, and are input into the second AND gate 111 of the exclusive-NOR circuit. The output of the first AND gate 110 and the output of the second gate 111 are input to the OR gate 114. The output of each OR gate is provided as an input to one of eight 8-input NAND gates 115–122 (the NAND gates 116–121 are not shown). There is one 8-input NAND gate for each byte being compared. The output of any of the 8-input NAND gates 204–210 will be low or logical "0" only when all eight bits being compared are equal and thus will indicate that the particular byte pair is equal to each other (e.g., when all the bits A00–A07 of the Register A are equal to the corresponding bits B00–B07 of the Register B, the output of the 8-input NAND gate 115 will be low).

The output of NAND gates 115–122 are stored in the Processor Status Register 100 or "hit" register (FIG. 2). An instruction (BAH) causes the system to branch or proceed to a predetermined memory location when any of the bits in the Processor Status Register 100 indicate that any of the eight bytes being compared are equal. Alternatively, if there are no bits in the Processor Status Register 100, indicating that no byte pairs match and no control character was found, the system proceeds to execute the instruction found in the next sequential memory location in the control memory of the processor. If a hit occurs, the location of the particular bytes which do match can be determined by looking at which bits of the Processor Status Register 100 indicate a match.

For example, if byte 3 of the Register A is equal to byte 3 of the Register B, bit 3 in the Processor Status Register will be zero, indicating that the byte 3 pair matches.

FIG. 4 shows a representative instruction sequence. The left column corresponds to the line number in the control program of the processor. The instruction at line 80 causes the control character being compared to be loaded into the Register A. The instruction at line 82 causes the loading of Register B with the first eight bytes of data (data word 1, indicated as "DATA1" in FIG. 4). The instruction at line 84 performs the multibyte "exclusive-NOR" operation of the present invention on the data in the Register B and the Register A. The instruction at line 86 causes the system to branch to a memory location 400 if any of the bits in the Processor Status Register 100 (FIG. 2) are zero indicating that a match was found between the Registers A and B. At memory location 400, which is executed if a hit is found, is the beginning of a routine which examines the bits of the Processor Status Register 100 to determine the location of the characters within data word 1 which match the control character "EOS" for example.

Then at line 88, Register A is loaded with a second control character and at line 90 the exclusive-NOR operation is performed to determine whether the second control character is present in any of the eight bytes of data in DATA1. If the second control character is found in DATA1, then at line 92 the program branches to memory location 400.

When there are no control characters found in the data, the instruction at line 94 is executed and the data in Register B is stored in a buffer. Thereafter, the system proceeds to execute the instruction at line 80 and the process described above repeats. Thus, eight bytes are checked for two different control characters with only two compare cycle in contrast to the 16 compare cycles required in prior art machines.

A "branch on no-hits" may be utilized as an alternative to the "branch on any hit" instruction, which branches to a memory location if none of the bytes in the data word contain the control character.

When the data is checked for more than one set of characters, the Register A may be reloaded with the characters for each compare sequence. However, to increase the execution speed, reloading the register may be avoided by various methods known to those skilled in the art. An n-to-1 multiplexer may be substituted for the Register A, where n is the number of character sets to be searched for in the data. For example, if the data is to be searched for two sets of characters, "EOS" and "CR," to 2-to-1 multiplexer may be utilized, with the registers containing "EOS" and "CR" serving as input to the multiplexer.

In the preferred embodiment, the architecture of the CPU permits the selection of the desired register for input to the exclusive-NOR circuit. Instructions cause the CPU to route the contents of the selected register to the exclusive-NOR circuit. Alternatively, tri-state devices may be utilized.

In the actual embodiment, an arithmetic logic unit (ALU) is utilized to perform the exclusive-OR function. Referring to FIG. 5, the End of Sector (EOS) or other control characters are loaded into the A register file. The date which is to be searched for the End of Sector flag is loaded in register B via the B bus 172. The EOS flag is input to the ALU through the A latch 142 and the data to be compared to determine whether it contains "EOS" characters is input to the ALU through B latch 144. The ALU compares each bit of input from the A register to the corresponding bit of input from the B register. For each matching bit pair, the ALU will generate a zero on the respective output line. The output of the ALU is input to the zero detect circuit (which comprises 8-input NOR gates) via the F bus 148. The zero detect circuit determines whether all of the bits within a byte are zero. If all of the bits within a particular byte are zero, a one is generated by the zero detect circuit indicating that a particular byte from the A register matches the byte from the B register. The foregoing embodiment utilizes inverse logic from the illustrative circuit shown in FIG. 3. In the circuit shown in FIG. 3, a zero is generated when the byte pairs match.

A parallel string processor in accordance with another aspect of the invention is shown in FIG. 5. The processor includes a dual register file 120 comprising an A register file and a B register file. Although only nine registers are shown in each register file, each register file includes 1024 registers, and may include more if desired. In this embodiment, the processor of FIG. 5 is for a 64-bit minicomputer, and so each of the registers in the A and B register files is 64 bits, or eight bytes, wide. The A register file is shown to include an address register 122, a length register 124, a bit mask register 126, a byte mask register 128, and a test register 130. The address register 122 is used to store the address to a data string, either a bit string or a character string, that is to be searched by the processor for a particular keyword. The length register 124 is used to store the length of the portion of the data string that remains to be tested. The bit mask register 126 is used to store a desired pattern of bits that is used to mask the keyword. For example, the bit mask register 126 might be used to ignore capital letters so that the processor would consider the letter "a" to be equivalent to the letter "A." The byte mask register 128 contains a desired pattern of bytes used to mask the keyword. For example, the byte mask register 128 might be used to ignore the second letter of a word so that the processor would equate the word "string" with "spring." The test register 130 contains the desired keyword after it has been masked with the desired byte mask.

The B register file contains a bit count register 132 and a byte count register 134 which, as is explained in more detail hereinafter, determine when the next portion of the data string being tested for the presence of the keyword needs to be fetched from memory. A keyword register 136 contains the binary data string corresponding to the desired keyword, and the end-of-string (END) flag register 138 contains a flag that indicates whether or not a data string has been completely searched for the presence of a desired keyword.

The A and B register files are connected to an arithmetic logic unit (ALU) 140 through an A latch 142 and a B latch 144, respectively. The ALU 140 is a conventional arithmetic logic unit, which in this embodiment may include SN54LS381A ('381), SN54LS382 ('382), or similar integrated circuit chips commercially available from Texas Instruments of Dallas, Texas. The arithmetic logic unit 140 performs various operations on the data supplied to its dual data inputs, depending upon the combination of binary signals supplied to its control inputs by an ALU function select circuit 146. For example, when the ALU 140 receives a particular combination of control inputs, the ALU 140 adds its two data inputs. In response to a different combination of its control inputs, the ALU 140 performs an exclusive-or operation on its data inputs.

The A and B register files are designed so that at any time, the binary information stored in each register is equal to the binary information stored in its adjacent resister so that the A register file is a copy of the B register file, and vice-versa. This register organization speeds up the operation of the processor. In order to perform an operation on two operands, one operand must be transmitted to the A latch 142 and the other to the B latch 144. If there were only an A register file, the processor would require an extra cycle to perform any given ALU operation.

Figure 7:
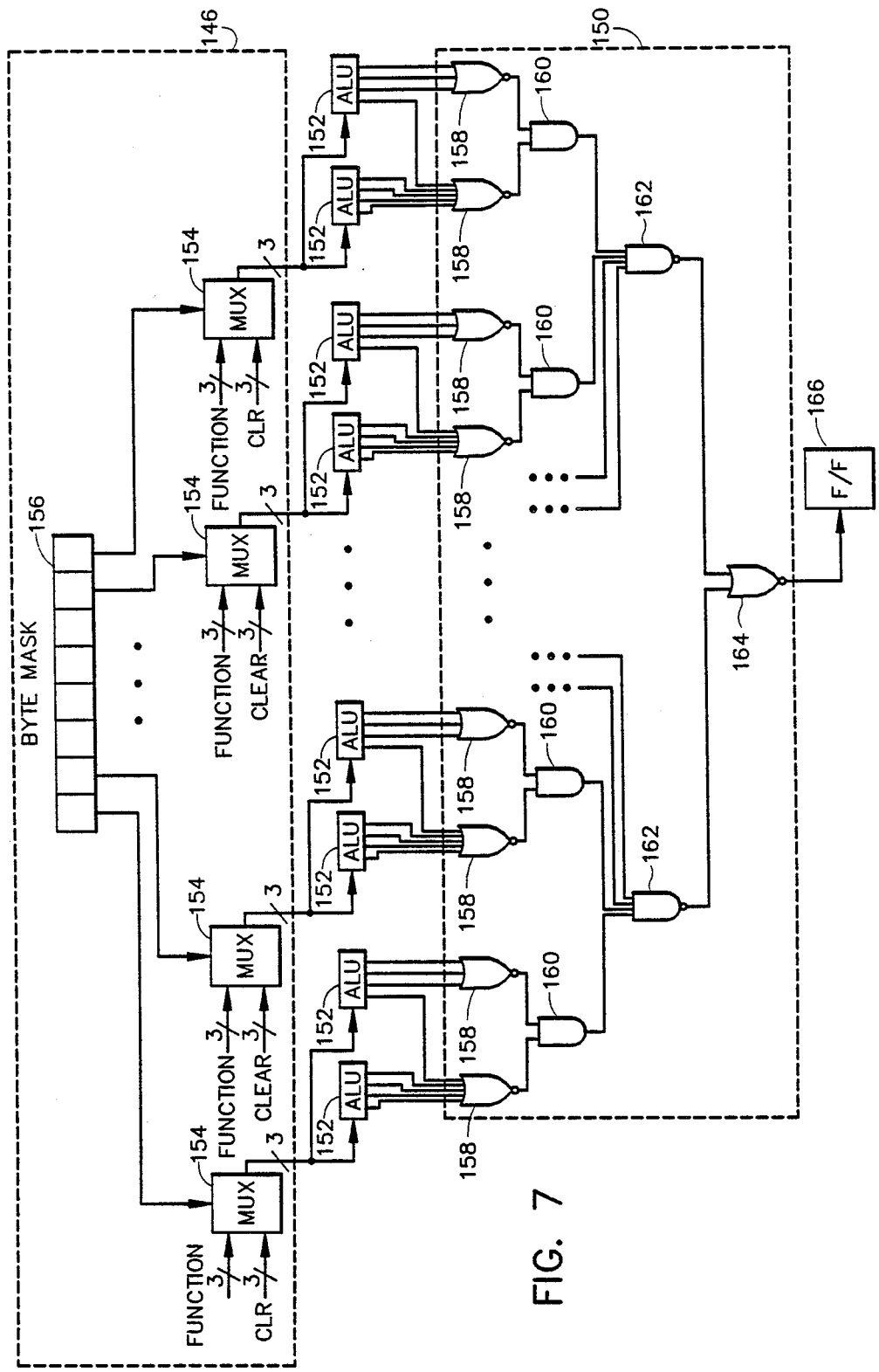
FIG. 7 is a detailed circuit diagram of a portion of the parallel string processor of FIG. 5.

The output of the ALU 140 is connected via an 64-bit-wide F-bus 148 to a zero-detect circuit 150 which detects when all the outputs of the ALU 140 are zero. The ALU 140, ALU function select circuit 146, and zero detect circuit 150 are shown in detail in FIG. 7. The ALU function select circuit 146 is shown functionally (in dotted lines) for purposes of explaining the invention. In reality, the function select circuit 146 is implemented with programmable array logic integrated circuits commercially available from Monolithic Memories, Inc. of Santa Clara, California, that are programmed with many equations that do not facilitate explanation.

The ALU comprises 16 separate, 4-bit '381 integrated circuit chips 152. For purposes of clarity, the data inputs of the ALU chips 152 that are connected to the A and B latches 142, 144 have been omitted from FIG. 7, and only the outputs of the chips 152 are shown. Each pair of the chips 152 is connected to a respective multiplexer 154 which supplies the control inputs for the chips 152. Each of the multiplexers 154 either supplies a desired 3-bit FUNCTION signal or a 3-bit CLEAR signal to the control inputs of the pair of chips 152 to which it is connected, depending upon the value of its address signal sent from a register 156 which stores the 8 bits of the byte mark. As explained above, the byte mask causes the processor to ignore certain bytes in the data string being searched so that, for example, the processor would equate the keyword "string" with the word "spring" in the data string, in which case the second bit of the byte mask would be set to logic "1" so that the "p" in the "spring" is ignored. Similarly, if it were desired that the fourth letter of a word were to be ignored, the fourth bit of the byte mask would be set to logic "1." The multiplexers 154 either supply a specified FUNCTION signal or a CLEAR signal to the chips 152, depending upon whether the value of the particular bit of the byte mask in the register 156 is logic "1" or "0." If the bit in the byte mask is logic "0," the desired 3-bit FUNCTION signal is transmitted, and if the bit in the byte mask is logic "1," the 3-bit CLEAR signal is sent, which causes the outputs of the ALU chips 152 to which it is connected to be forced to logic "0."

The zero detect circuit 150 comprises 16 NOR gates 158 connected to receive the outputs of the ALU chips 152. The outputs of the NOR gates 158 are connected to eight AND gates 160, which in turn are connected to a pair of NAND gates 162 which are connected to a NOR gate 164. If all outputs of the ALU chips 152 are logic "0," than it can be seen that the outputs of the NOR gates 158 will be forced to logic "1," which forces the outputs of the AND gates 160 to logic "1," the NAND gates 162 to logic "0," and the NOR gate 164 to logic "1." Thus, the output of the NOR gate 164 will be logic "1" only when all the outputs of the ALU chips 152 are logic "0." As set forth below, when the keyword matches a portion of the data string to which it is being compared using the exclusive-or function, all the ALU chip outputs will be logic "0," so that in essence a logic "1" output of the NOR gate signals a match. This logic "1" output is supplied to a flip-flop 166 which can then be checked to determine that there was a match.

The particular logic gates used in the zero detect circuit 150 are not important to the invention since other circuits could be easily designed to detect that all outputs of the ALU chips were logic "0," such as, for example, a single 64-bit NOR gate.

Referring now to FIG. 5, the F-bus 148 is connected to an A-bus 168 via a buffer 170 and a B-bus 172 via another buffer 174. The zero-detect circuit 150 is coupled to the B-bus 172 through a buffer 176. A memory 178 is connected to the bus 180 that connects the output of the A latch 142 to the ALU 140 through a buffer 182 connected to an M-bus 184. Because this embodiment is for a 64-bit minicomputer, the A-bus 168, the B-bus 172, and the M-bus 184 are also 64 bits wide. A pair of serially connected 64-bit shift registers, comprising a J shift register 186 and a K shift register 188, are connected to the B-bus 172. A mask register 190 is connected to the J shift register 186 via a mask bus 192. As is explained in more detail below, these shift registers are used to store portions of the data string to be tested for the presence of a desired keyword.

A trio of control signals is supplied to each of the two shift registers 186, 188. A LOAD signal causes the register to which it is attached to be parallel-loaded with a portion of a data string. The data is loaded into the registers 186, 188 from the memory 178 through a data route consisting of the ALU 140, the F-bus 178, the buffer 174, and the B-bus 172. A second signal S1 causes its respective shift register to be shifted left one bit, and a third signal S8 causes its respective shift register to be shifted left eight bits, or one byte.

Figure 6:
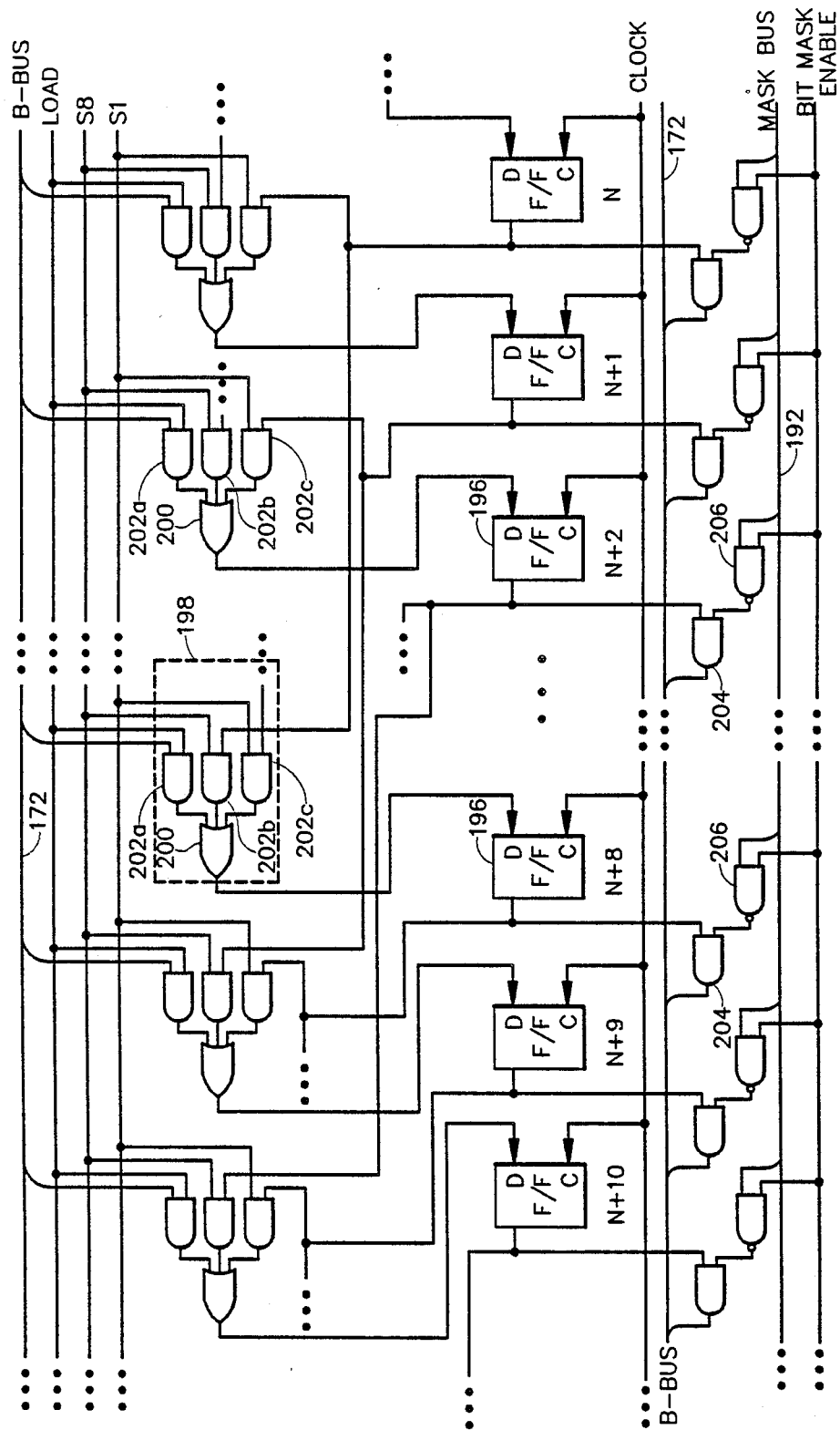
FIG. 6 is a detailed circuit diagram of a portion of one embodiment of a shift register in accordance with the invention.

FIG. 6 is a portion of a substantially functional equivalent of the J shift register 186 used for purposes of explaining the invention. The actual embodiment of the J and K shift registers 186, 188 comprises specially programmed conventional programmable array logic integrated circuits commercially available from Monolithic Memories, Inc. of Santa Clara, California.

Referring now to FIG. 6, a portion of the J shift register 186 consisting of logic gates and flip-flops 196 is shown. Although only six flip-flops 196 are shown, the J shift register 186 is 64 bits wide and thus includes 64 serially connected flip-flops 196. In FIG. 6 the flip-flops 196 are numerically ordered, with the rightmost flip-flop being the Nth flip-flop, the flip-flop to the left of the Nth flip-flop being the (N+1)st flip-flop, etc. Each of the flip-flops 196 has a data input D connected to the output of a logic circuit 198 and a clock input C connected to receive a CLOCK signal that controls the speed of operation of the shift registers 186, 188.

The logic circuits 198 control the loading and shifting operations of the flip-flops 196. Each of the logic circuits 198 comprises a three-input OR gate 200 and three two-input AND gates 202. One of the AND gates 202 has a first input connected to one of the 64 lines of the B-bus 172 and has its second input connected to the LOAD signal. This AND gate 202a in each of the logic circuits 198 causes the flip-flop to which it is connected to be loaded with the binary value of the B-bus 172 when the LOAD signal is activated, which occurs when the LOAD signal is logic "1." In this state, the output of the AND gate 202a, which equals the binary value of the B-bus input, is supplied to its respective flip-flop 196 through its OR gate 200. The outputs of the other two AND gates 202b, 202c do not interfere with this loading process since the S1 and S8 signals are forced to logic "0" when the LOAD signal is activated.

After a portion of a data string is loaded into the flip-flops 196 of the shift registers 186, 188, the portion is periodically shifted either one bit or eight bits at a time, depending on whether the processor is performing a bit-by-bit comparison or a byte-by-byte comparison. If bit comparisons are being performed, the S1 signal is activated to logic "1" while the LOAD and S8 signals remain at logic "0." Each AND gate 202c to which the S1 signal is supplied has its other input connected to the output of the first upstream flip-flop, "upstream" meaning the direction from which data is being shifted. In FIG. 6, data is being shifted from right to left, and thus with respect to any particular flip-flop or other circuit element, the first "upstream" flip-flops is the first flip-flop to the right of the circuit element and the first "downstream" flip-flop is the first flip-flop to the left of the circuit element. Thus, when the S1 signal is activated, the output of the AND gate 202c to which it is connected is equal to the output of the upstream flip-flop. Since the output of the AND gate 202c is passed through its respective OR gate 200 to the input of the downstream flip-flop, the activation of the S1 signal causes the shift registers 186, 188 to perform a one-bit logical left shift on the portion of the data string stored therein.

The activation of the S8 signal causes an eight-bit, or one-byte, logical left shift to be performed by the shift registers 186, 188. Each AND gate 202b to which the S8 signal is connected has its other input connected to the output of the eighth upstream flip-flop so that when the S8 signal is logic "1," the output of each of the flip-flops 106 is passed to the eighth respective downstream flip-flop so that the portion of the data string is shifted eight bits to the left.

Another portion of the J shift register 186 performs a bit mask operation so that any desired bits of the string being searched may be ignored. For example, as described above, it might be desirable to ignore capital letters so that the processor would consider the letter "a" to be equivalent to the letter "A." To this end, the output of each of the flip-flops 196 is supplied to one input of a two-input AND gate 204 having its other input connected to receive the output of a NAND gate 206. One input of the NAND gate 206 is connected to receive a respective bit of the bit mask from the mask register 190 connected to the J shift register via the mask bus 192. The NAND gate 206 is also connected to receive a BIT MASK ENABLE signal that selectively activates or deactivates the bit mask operation. In particular, when the BIT MASK ENABLE signal is logic "0," the outputs of all of the NAND gates 206 are forced to logic "1" so that the outputs of the AND gates 204 equal the output of the flip-flops to which they are connected and are not affected by the outputs of the NAND gates 206. However, when the BIT MASK ENABLE signal is logic "1" and the corresponding mask input bit is also logic "1," the output of the NAND gate 106 is forced to logic "0," and as a result, the output of the AND gate 204 is also forced to logic "0." This operation thus causes logic "0"s to be placed in each bit of the data string which is to be ignored by the processor. As is described in more detail below, each of these logic "0"s causes a forced match when the masked portion of the data string is compared to the keyword string by the processor. Finally, the output of each of the AND gates 204 is connected to the B-bus 172 so that the masked or unmasked portion of the data string stored in the shift registers may be supplied to the ALU 140 for comparison to the keyword string.

The particular logic used for the masking functions is not important, and alternative logic could be used. For example, selected bits in a bit string could be masked off if the corresponding bits in the bit mask were logic "0" instead of logic "1" if the NAND gates 206 were replaced with OR gates, in which case the bit mask enable signal would be activated when logic "0" instead of logic "1."

The functional circuit diagram of the K shift register 188 is substantially identical to the diagram of the J shift register shown in FIG. 6, except that the AND gates 204 and the NAND gates 206 used in connection with the bit mask and the BIT MASK ENABLE signal are not required since only the output of the J shift 186 register is sent to the ALU 140 for comparison to the keyword, as is explained in more detail below.

In its byte mode of operation, the processor compares a selected string of bytes to determine the presence of a selected keyword. Both the byte string and the keyword are selectable by the user of the processor. The basic process by which the processor tests for the presence of a selected keyword string within a selected data string includes initially loading the J and K shift registers 186, 188 with the first portion of the data string to be tested. Then, the entire contents of the J shift register 186 are simultaneously compared with the keyword stored in the test register 130. If there is a match, the presence of a match is indicated by the processor. Then, the contents of the J and K registers 186, 188 are shifted left one byte and the contents of the J register 186 are again compared with the contents of the test register 130. Any match is indicated, and the process is repeated. Periodically, the K register 188 will become empty since its contents are gradually shifted into the J register 186, and so the K register will be periodically reloaded with the next portion of the data string to be tested. In this manner, the entire keyword is simultaneously compared with a corresponding portion of the data string. This process reduces the number of comparisons required as shown by the example shown below, in which the keyword is "the," the data string is "that time is the essence," and each number above the data string represents the number of comparisons that were required to determine whether or not the keyword matched that particular portion of the data string:

| Comparisons: | 11111111111111 |
|---|---|
| Data String: | that time is the essence |
| Keyword: | the |

Note that this particular example required 14 comparisons to find the keyword "the" in the character string "that time is the essence" in contrast to the 21 comparisons that were required by a conventional data string processor as shown above. This reduction results from the entire keyword simultaneously being compared with a portion of the data string, instead of being compared one byte at a time.

Figure 8:
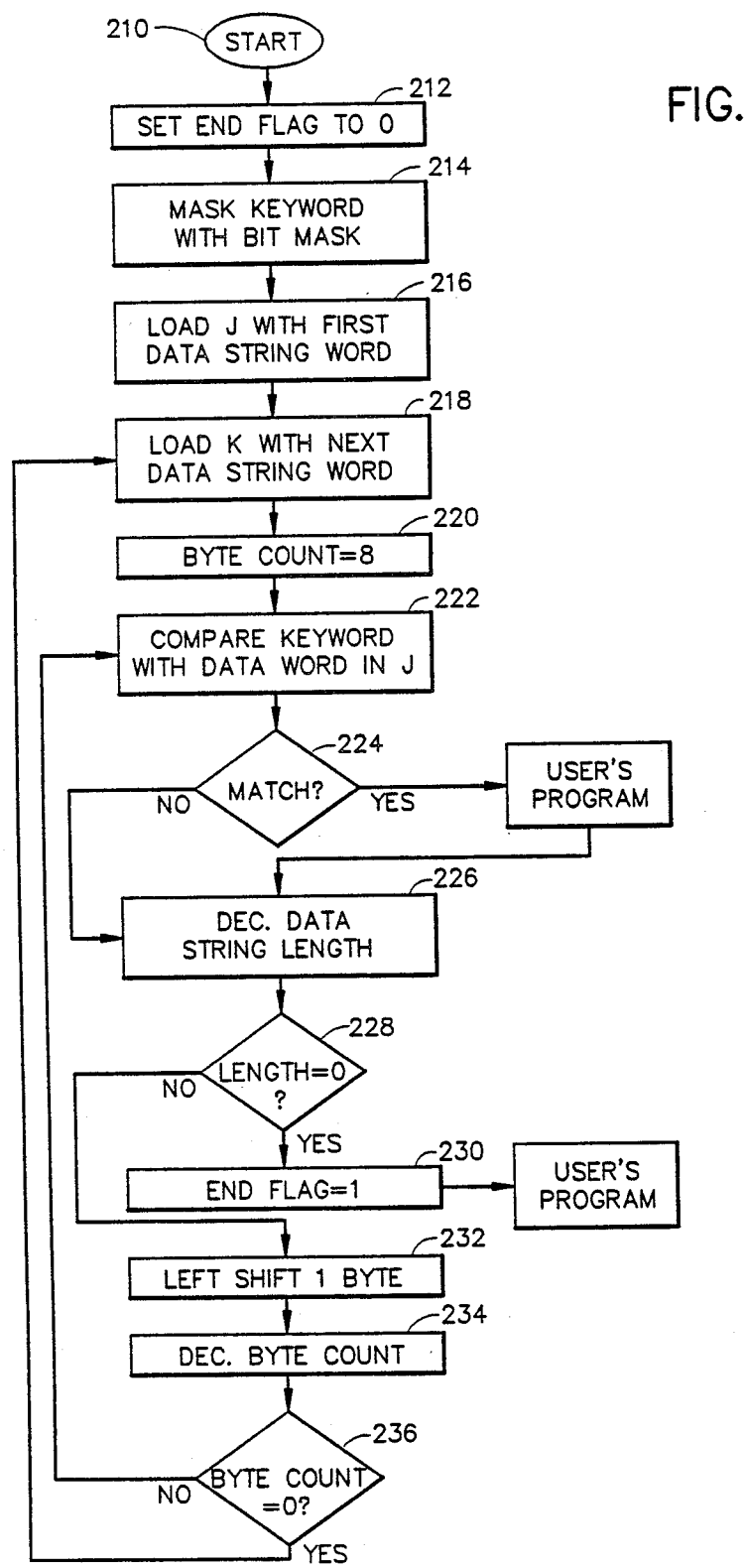
FIG. 8 is a detailed flowchart of the operation of the parallel processor of FIG. 5 in its byte mode of operation.

The detailed operation of the byte mode of the processor is explained with reference FIG. 8 and Table 1. FIG. 8 is a flowchart of the microcode that controls the operation of the processor shown in FIG. 5, and Table 1 includes a software program that is substantially functionally equivalent to the microcode actually used. The operation is explained with reference to Table 1 and not the actual microcode used because the actual microcode would be incomprehensible since it is merely a collection of "1"s and "0"s.

TABLE 1

| 1 | | MOV | #0, ENDFLAG | reset end-of-string flag to 0 |
|---|---|---|---|---|
| 2 | | MOV | BITMASK, A | mask keyword with bit mask |
| 3 | | MOV | KEYWORD, B | |
| 4 | | AND | A, B | |
| 5 | | MOV | ALU, TEST | put masked keyword in test register |
| 6 | | MOV | @ ADDRESS, J | load J with first 8 bytes of data string |
| 7 | LOADK: | MOV | ADDRESS, A | |
| 8 | | MOV | #8, B | increment address by to get next 8 bytes of data string and then load in K |
| 9 | | ADD | A,B | |
| 10 | | MOV | ALU, ADDRESS | |
| 11 | | MOV | @ ADDRESS, K | |
| 12 | | MOV | #8, BYTECOUNT | K now contains 8 bytes |
| 13 | COMPARE: | MOV | TEST, A | compare masked keyword with J |
| 14 | | MOV | J,B | |
| 15 | | XOR | A,B | |
| 16 | | MOV | ALU, ZD | zero output? |
| 17 | | BNZ | NOMATCH | |
| 18 | MATCH: | JMP | USERPROGRAM | |
| 19 | | RET | | |
| 20 | NOMATCH: | MOV | #1, B | decrement length of data string tested by 1 byte |
| 21 | | MOV | LENGTH, A | |
| 22 | | SUB | A, B | |
| 23 | | MOV | ALU, LENGTH | |
| 24 | | MOV | ALU, ZD | |
| 25 | | BNZ | NEXT | data string completely tested? |
| 26 | EOS: | MOV | #1, ENDFLAG | set end-of-data-string flag to 1 |

TABLE 1-continued

| 27 | | END | | |
|---|---|---|---|---|
| 28 | NEXT: | LLS | BYTE | left-shift J, K by 1 byte |
| 29 | | MOV | #1, B | decrement # of bytes in K by 1 |
| 30 | | MOV | BYTECOUNT, A | |
| 31 | | SUB | A, B | |
| 32 | | MOV | ALU, ZD | if no bytes left in K, get next 8 bytes of data string to load in K |
| 33 | | BZ | LOADK | |
| 34 | | MOV | ALU, BYTECOUNT | |
| 35 | | BR | COMPARE | test for match again |

© DAVIN COMPUTER CORP. 1987

At the start of the byte operation of the processor indicated by the start step 210 of FIG. 8, the binary representation of the keyword is stored in the keyword register 136 in the B register file and the binary representation of the data string is stored in the memory 178. Also, the desired bit mask is stored in the bit mask register 126 and in the mask register 190, the desired byte mask is stored in the byte mask register 128 and in the register 156, the address of the byte string in memory 178 to be searched is stored in the address register 122, and the length of bytes of the byte string being searched is stored in the length register 124.

The value of the end-of-string (END) flag indicates whether or not the data string has been completely searched for the presence of the keyword. At step 212 of FIG. 8, the value of the END flag is reset to indicate that the end of the string has not yet been reached. Then, at step 214, the keyword is masked with the bit mask to ensure that the processor ignores any bits in any desired byte as selected by the user. This step is carried out by instructions 2–5 of Table 1. Instructions 2 and 3 supply the bit mask to one data input of the ALU 140 and the keyword to the other data input. Instruction 4 causes the appropriate control signal to be supplied to the ALU so that its two data inputs are logically "anded" together, and the ALU output, which is the value of the masked keyword, is stored in the test register 130 in the A register file via a data path consisting of the F-bus 148, the F-A bus buffer 170, and the A-bus 168. Thus, any bits of the keyword which are to be ignored by the processor are masked to logic "0," and these masked zero bits will force a match with the corresponding bit position in the data string during subsequent comparisons as is explained in more detail below.

Next, at step 216, the J shift register 186 is loaded with the first word of the data string to be tested, "word" meaning a block of binary data eight bytes long to correspond to the eight-byte width of the J shift register 186. The step 216 is accomplished by instruction 6 in Table 1 which moves the contents of the memory at the address where the data string is stored to the J shift register 186 through a path including the memory buffer 182, the M-bus 184, the ALU 140, the F-bus 148, the F-to-B buffer 174, and the B-bus 172. Next, at step 218, the next word, or eight bytes, of the data string are loaded into the K shift register 188 from the memory 178 in a similar manner by instructions 7–11. Specifically, instructions 7–10 cause the address to be incremented by eight so that the incremented address will point to the next eight bytes of the data string in memory 178. Then instruction 11 causes the next eight bytes to be fetched from memory 178 and put into the K shift register 188 via the same data path as described in connection with the loading of the J shift register 186.

When the K shift register 188 has just been loaded, at step 220 and by instruction 12, the numeric value eight is stored in the byte count register 134 since there are now eight bytes of string data in the K register 188. Because the contents of the K register 188 are periodically shifted left into the J shift register 186, it is important to know how many bytes of the data string are left in the K register 188 so that the processor will know when to reload the K register with the next portion of the data string.

Next, at step 222, the masked keyword stored in the test register 130 is compared to the portion of the data string stored in the J register 186. This step is implemented by the instructions 13–16 of Table 1. Specifically, instruction 13 causes the masked keyword stored in the test register 130 to be sent to the A latch 142. Then, instruction 14 causes the contents of the J shift register 186 to be moved to the B latch 144 via the B-bus 172. If the BIT MASK ENABLE signal is logic "1," then the contents of the J register 186 are logically "anded" with the bit mask by the AND Gates 204 prior to being sent to the B latch 144. At instruction 15, the binary value of the masked keyword is compared to the binary value of the masked portion of the data string by providing the ALU FUNCTION signal with the binary values that cause the ALU 140 to perform a bit-by-bit logical "exclusive-or" of its two data inputs. The logical exclusive-or operation, which is conventional and well known, is a sum modulo 2 operation. Thus, a bit-by-but logical exclusive-or provides a logic "0" output if its two bit inputs are both logic "1" or logic "0," and hence match, and a logic "1" output if its two bit inputs are different. As a result, for each byte of the data string that matches the corresponding byte in the keyword, a logic "0" will be produced in the corresponding byte position.

After the keyword is compared with the portion of the data word in the I register 186, upon a match at step 224 the processor proceeds to the user's program so that the user program may perform its programmed function, for example, replace the keyword that was located with a different word, whereupon the user program returns control to the processor so that any other occurrences of the keyword can be found. The existence of a match is determined by the zero detect circuit at instruction 16. Instruction 16 causes the contents of the ALU 140 to be sent to the zero detect circuit 150. As mentioned above, for each byte position of the ALU 140 in which there was a match, the ALU output will be zero. Consequently, at instruction 17, the zero detect circuit 150 tests each byte of the ALU to determine whether all bytes are zero, in which case all unmasked bytes of the keyword match all unmasked bytes of the data string portion. When the masked bytes are compared by the ALU 140 during its exclusive-or operation, the ALU output corresponding to each masked byte is forced to logic "0," which is the same logical output that the ALU provides in case of a match. Thus, each logic "1" bit in the byte mask forces a match in its corresponding byte position in the keyword. Upon a match, instruction 18 will cause a return to the user's program, and the user program will return control to the processor at instruction 19. If there is no match, instruction 17 will cause instructions 18 and 19 to be skipped.

At step 226, the length of the data string will be decremented by one byte since one byte has just been tested and thus there is one less byte in the data string that needs to be tested. This step is implemented by instructions 20–23. Instruction 20 causes the number one to be moved to the B latch 144, and instruction 21 causes the current data string length to be sent to the A latch 142. Instruction 22 causes the ALU 140 to subtract one from the current length, and the new length is stored in the length register 124 by instruction 23.

Next, at step 228, the new data string length stored in the length register 124 is tested to determine whether all of the bytes in the data string have already been compared to the keyword, which will be the case if the numeric value of the length is zero. This is accomplished at instruction 24 which sends the output of the ALU 140 to the zero detect circuit 150. If the value of length is zero, then step 230 is executed, causing the END flag to be set to logic "1" to indicate that the end of the string has been reached, and control is returned to the user's program. This is accomplished by instructions 26 and 27.

If the value of length is nonzero and the data string has not been completely tested, the program branches to step 232 at which the contents of the J and K registers 186, 188 are shifted left by one byte. This is accomplished by instruction 28, which causes a logic "1" S8 signal to be sent to the shift registers 186, 188 so that their contents are shifted left one byte as explained above. The contents of the byte count register 134 are then decremented by one at step 234 to indicate that there is one less byte in the K shift register 188 since it has just shifted one of its bytes into the I shift register. This step is accomplished by instructions 29–31.

Next, at step 236, the numeric value of byte count is tested to determine if it is zero, in which case the next eight bytes of the data string need to be moved from the memory 178 into to K shift register 188, and so the program branches back to step 218 so that the K shift register 188 is reloaded. If the byte count is nonzero, the shift register 188 does not need to be reloaded, and the program branches to step 222 so that the current portion of the data string in the J register 186 may be compared to the masked keyword. Step 236 is executed by instructions 32–35. Instruction 32 causes the contents of the ALU 140 to be sent to the zero detect circuit 150. If the zero detect circuit 150 detects a zero, instruction 33 causes a branch to instruction 7. Instruction 34 saves the decremented value of the byte count if it is nonzero, and instruction 35 causes a branch back to instruction 13.

The bit mode of operation of the processor is generally similar to its byte mode of operation. In its bit mode of operation, the processor compares a selected string of bits to determine the presence of a selected keyword. Both the bit string and the keyword are selectable by the user of the processor. The basic process by which the processor tests for the presence of a selected keyword within a selected bit string includes initially loading the J and K shift registers 186, 188 with the first portion of the bit string to be tested. Then, the entire contents of the J shift register 186 are simultaneously compared with the keyword stored in the test register 130. IF there is a match, the presence of a match is indicated by the processor. Then, the contents of the J and K registers 186, 188 are shifted left one bit and the contents of the J register 186 are again compared with the contents of the test register. Any match is indicated, and the process is repeated. Periodically the K register 188 will become empty since its contents are gradually shifted into the J register 186, and so the K register 188 will be periodically reloaded with the next portion of the bit string to be tested. In this manner, the entire keyword is simultaneously compared with a corresponding portion of the bit string. This process reduces the number of comparisons required as shown by the example shown below, in which the keyword is "1101," the bit string is "11001110011011," and each number above the bit string represents the number of comparisons that were required to determine whether or not the keyword matched that particular portion of the bit string:

| Comparisons: | 1111111111 |
|---|---|
| Bit String: | 11001110011011 |
| Keyword: | 1101 |

Note that this particular example required only 10 comparisons to find the keyword "1101" in the bit string "11001110011011" in contrast to the 22 comparisons that were required by a conventional bit string processor as shown above. This reduction results from the entire keyword simultaneously being compared with a portion of the bit string, instead of being compared one bit at a time.

Figure 9:
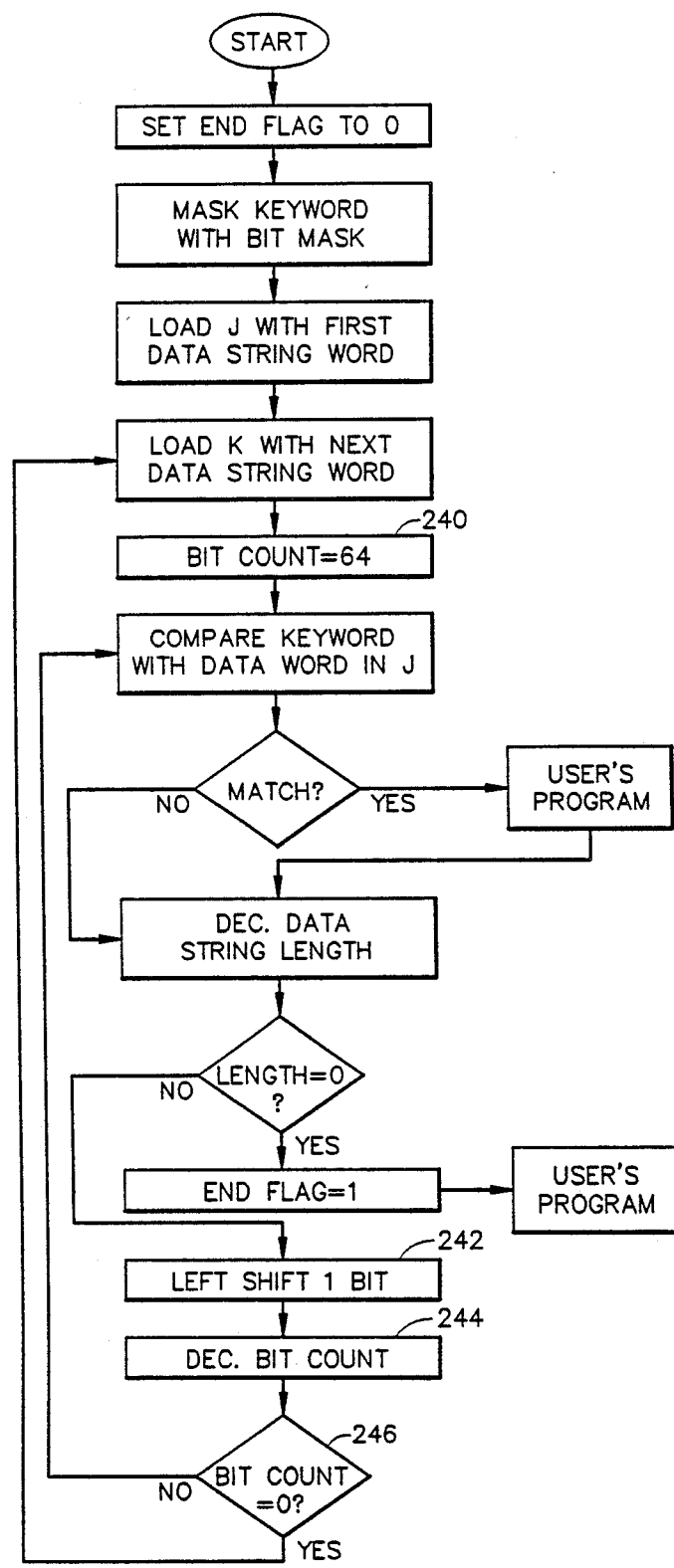
FIG. 9 is a detailed flowchart of the operation of the parallel processor of FIG. 5 in its bit mode of operation.

The detailed operation of the bit mode of the processor is very similar to the byte mode, and can be understood with reference to FIG. 9 and Table 2 set forth below. FIG. 9, which is a flowchart of the microcode that controls the operation of the processor, is very similar to the flowchart of FIG. 8, except that in a number of instances different operations are executed since the processor is in its bit mode of operation and not its byte mode. Likewise, the software implementation set forth in Table 2 is very similar to that of Table 1, so that only the differences need be explained to provide a clear understanding of the detailed operation of the bit mode of operation.

TABLE 2

| 1 | | MOV | #0, ENDFLAG | reset end-of-string flag to 0 |
|---|---|---|---|---|
| 2 | | MOV | BITMASK, A | mask keyword with bit mask |
| 3 | | MOV | KEYWORD, B | |
| 4 | | AND | A, B | |
| 5 | | MOV | ALU, TEST | put masked keyword in test |
| 6 | | MOV | @ ADDRESS, J | register load J with first 64 bits of data string |
| 7 | LOADK: | MOV | ADDRESS, A | |
| 8 | | MOV | #8, B | increment address by 8 to get next 64 bits of data |
| 9 | | ADD | A,B | string and then load in K |
| 10 | | MOV | ALU, ADDRESS | |
| 11 | | MOV | @ ADDRESS, K | |
| 12 | | MOV | #64, BITCOUNT | K now contains 64 bits |
| 13 | COMPARE: | MOV | TEST, A | compare masked keyword with J |
| 14 | | MOV | J,B | |
| 15 | | XOR | A,B | |
| 16 | | MOV | ALU, ZD | zero output? |
| 17 | | BNZ | NOMATCH | |
| 18 | MATCH: | JMP | USERPROGRAM | |
| 19 | | RET | | |
| 20 | NOMATCH: | MOV | #1, B | decrement length of data string tested by 1 bit |
| 21 | | MOV | LENGTH, A | |
| 22 | | SUB | A, B | |
| 23 | | MOV | ALU, LENGTH | |
| 24 | | MOV | ALU, ZD | |
| 25 | | BNZ | NEXT | data string completely tested? |
| 26 | EOS: | MOV | #1, ENDFLAG | set end-of-data-string flag to 1 |
| 27 | | END | | |
| 28 | NEXT: | LLS | BIT | left-shift J, K by 1 bit |
| 29 | | MOV | #1, B | decrement # of bits in K by 1 |
| 30 | | MOV | BITCOUNT, A | |
| 31 | | SUB | A, B | |
| 32 | | MOV | ALU, ZD | if no bits left in K, get next 64 bits of data string to load in K |
| 33 | | BZ | LOADK | |
| 34 | | MOV | ALU, BITCOUNT | |
| 35 | | BR | COMPARE | test for match again |

© DAVIN COMPUTER CORP. 1987

In particular, at step 240 in FIG. 9 and instruction 12 in Table 2, the contents of the bit count register 132 are set to 64 since the K shift register 188 will be shifted one bit at a time and 64 bits are initially loaded into the K register 188. At step 242 and instruction 28, the contents of the J and K shift registers 186, 188 are shifted left one bit instead of byte. At step 244 and instructions 29-32, the contents of the bit count register 132 instead of the byte count register 34 are decremented by one. Finally, at step 246 and instructions 32-35, the conditional branch occurs when the value of the bit count register 132 has reached zero, and not the byte count register 134.

The two modes of operation just described are invoked by a user by including appropriate software instructions in the user's program. Specifically, the byte mode of operation is invoked by the instruction "SCANS" and the bit mode of operation is invoked by the instruction "BITSCAN."

Two further embodiment of the invention are identical to the embodiment just described, except that they are directed towards 16 and 32 bit parallel processors, respectively. The differences between these embodiments include the data width of the buses, buffers, ALU, A and B latches, and registers. Otherwise, the operation of these additional embodiments is the same.

Modifications and alternative embodiments of the invention will be apparent to those skilled in the art in view of the foregoing description. Accordingly, this description is to be construed as illustrative only, and is for the purposes of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A parallel byte processing system for locating a control character in a data word comprising a predetermined number of bytes, said system comprising:
   a first register to receive said bytes of said data word, said first register having a byte position for each of said predetermined number of bytes;

a second register to store copies of a predetermined control character, said copies being equal in number to said predetermined number of said bytes of said data word in said first register, said second register having a byte position for each of said copies; and comparison means which simultaneously compares each byte of said data word in said first register with the copy of said control character in the same byte position in said second register, and generates a control bit for each said byte position of said first register, a control bit for a byte position being in a first control bit state if said byte of said data word in said byte position of said first register is equal to said copy of said control character in the same byte position of said second register, and in a second control bit state when said byte of said data word in said byte position in said first register is not equal to said copy of said control character in the same byte position in said second register.

2. The system of claim 1, further comprising means to receive said control bits and generate a zero-detection indicator bit which has a first zero-detection indicator state and a second zero-detection indicator state, said zero-detection indicator bit being in said first zero-detection indicator state if all of said control bits are in said first control bit state and in said second zero-detection indicator state if any of said control bits are in said second control bit state.

3. The system of claim 1, further including a processor status register comprising a plurality of indicator bits, said plurality of indicator bits including one indicator bit for each of said predetermined number of control bits, each of said predetermined number of indicator bits having a first indicator bit state when the respective control bit has said first control bit state and a second indicator bit state when the respective control bit has said second control bit state.

4. The system of claim 3, further including first instruction means to branch to a first memory location if any of said indicator bits stored in said processor status register are in said first indicator bit state.

5. The system of claim 4, further including second instruction means to branch to a second memory location if all of the indicator bits in said processor status register are in said second indicator bit state.

6. The system of claim 4, further including programming means for determining the location of said control character within said data word.

7. A method for locating a control character in a data word comprising a plurality of bytes, said method comprising the steps of:
inputting said plurality of bytes of said data word into a comparison means;
inputting copies of a predetermined control character byte into said comparison means, the number of copies of said control character being equal to the number of bytes of said data word;
simultaneously comparing said bytes of said data word with said copies of said control character, each said byte of said data word in a given byte position being compared to a copy of said control character that has the same byte position; and
generating an indicator bit for each said byte of said data word, said indicator bit for a byte being in a first state if said byte of said data word is equal to said copy of said control character and in a second state if said byte of said data word is not equal to said copy of said control character.

8. The method of claim 7, further including the step of storing said indicator bits in a processor status register.

9. The method of claim 8, further including the step of branching to a first memory location if at least one of said indicator bits in said processor status register is in said first state.

10. The method of claim 9, further including the step of branching to second memory location if all of said indicator bits in said processor status register are in said second state.

11. A character string processor that locates an occurrence of a keyword string within a character string, comprising:
a first register that stores a keyword string having a plurality of bytes;
a second register that stores a portion of a character string that is searched for the presence of said keyword string, said second register shifting said portion of said character string with respect to said keyword string one byte at a time; and
a circuit that simultaneously compares multiple bytes of said keyword string stored in given byte positions in said first register with multiple bytes of said character string stored in matching byte positions in said second register to detect the occurrence of said keyword string in said character string, said circuit providing an output signal having a first state when said keyword string in said first register matches said portion of said character string in said second register and having a second state when said keyword string is different from said portion of said character string.

12. A character string processor as defined in claim 11 wherein the storage capacity of said first and said second registers is 8 bytes.

13. A character string processor as defined in claim 11 additionally comprising a third register coupled to said second register, said third register storing a portion of said character string, the contents of said third register being periodically shifted into said second register one byte at a time.

14. A character string processor as defined in claim 13 wherein said circuit is an arithmetic logic unit.

15. A character string processor as defined in claim 14 additionally comprising a zero detect circuit coupled to the output of said arithmetic logic unit.

16. A character string processor as defined in claim 15 wherein said zero detect circuit comprises an OR gate.

17. A character string processor as defined in claim 16 wherein said second register and said third register are implemented with programmable array logic.

18. A character string processor that locates an occurrence of a keyword string within a character string, comprising:
a first register that stores a keyword string having a plurality of bytes, each byte being in a byte position in said register;
a first shift register that stores a first portion of a character string that is searched for the presence of said keyword string, each byte of said first portion of said character string being in a byte position in said first shift register, said first shift register shifting said first portion of said character string with respect to said keyword string one byte position at a time;

a second shift register coupled to said first shift register that stores a second portion of said character string, said second shift register shifting said second portion into said first shift register one byte at a time, said second shift register being loaded with an additional portion of said character string when said second portion is completely shifted into said first shift register; and an arithmetic logic unit that simultaneously compares the bytes in each byte position of said first register with the bytes of said first shift register having the same byte position to detect when the the bytes in each byte position of said first register are equal to the bytes having the same byte positions of said first shift register, said arithmetic logic unit providing an output signal having a first state when the bytes in said first register match the bytes in said first shift register and having a second state when the bytes of said first register are different from the bytes of said first shift register.

19. A method of identifying an occurrence of a particular word or combination of characters within a portion of text comprising the steps of:
 (a) loading a keyword string into a first register location, said first register location having a plurality of bytes in a plurality of byte positions, each of said bytes in said byte positions representing one character in said keyword string;
 (b) loading a first portion of a character string into a second register location, said second register location having a plurality of bytes in a plurality of byte positions, each of said bytes in said byte positions representing one character in said character string;
 (c) after said loading steps, simultaneously comparing the bytes in said byte positions of said first register location with the byte sin said byte positions of said second register location and setting an indicator bit when each said byte in said first register location is equal to the byte in the second register location having the same respective byte position, thereby determining whether said keyword string is present in said first portion of said character string;
 (d) shifting the contents of said second register location with respect to the contents of said first register location by a single byte; and
 (e) repeating said steps (c) and (d) at least once.

20. A method as defined in claim 19 additionally comprising the steps of:
 (f) loading a second portion of said character string into a third register location prior to said step (c); and
 (g) simultaneously with said step (d), shifting the contents of said third register location into said second register location by a single byte.

21. A method as defined in claim 20 additionally comprising the step of (h) reloading said third register location when the contents of said third register location have been completely shifted into said second register location.

22. A method as defined in claim 21 wherein said repeating step is performed until said keyword string is found to be present in said character string.

23. A method as defined in claim 22 wherein said step (e) is performed until said character string has been completely compared with said keyword string.

* * * * *